(12) United States Patent
Matsuoka et al.

(10) Patent No.: US 11,591,027 B2
(45) Date of Patent: Feb. 28, 2023

(54) BODY STRUCTURE FOR VEHICLE

(71) Applicant: HONDA MOTOR CO., LTD., Tokyo (JP)

(72) Inventors: Kiyohiko Matsuoka, Guangzhou (CN); Jianli Yu, Guangzhou (CN); Kai Ling, Guangzhou (CN)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/515,576

(22) Filed: Nov. 1, 2021

(65) Prior Publication Data
US 2022/0135140 A1     May 5, 2022

(30) Foreign Application Priority Data

Nov. 2, 2020   (CN) .......................... 202011206083.1

(51) Int. Cl.
| | |
|---|---|
| *B62D 25/04* | (2006.01) |
| *B62D 27/02* | (2006.01) |
| *B62D 25/20* | (2006.01) |
| *B62D 29/04* | (2006.01) |
| *B62D 21/15* | (2006.01) |

(52) U.S. Cl.
CPC ......... *B62D 25/04* (2013.01); *B62D 25/2036* (2013.01); *B62D 27/023* (2013.01); *B62D 29/043* (2013.01); *B62D 21/15* (2013.01)

(58) Field of Classification Search
CPC .. B62D 25/04; B62D 25/2036; B62D 27/023; B62D 21/157
USPC ........................................ 296/193.06, 29, 30
See application file for complete search history.

(56) References Cited

U.S. PATENT DOCUMENTS 7,731,272 B2 * 6/2010 Moore .................. B62D 21/15
296/193.06

FOREIGN PATENT DOCUMENTS

| CN | 208007078 U | 10/2018 | |
|---|---|---|---|
| CN | 108556924 B * | 1/2020 | ............. B62D 25/04 |
| JP | 2010083251 A * | 4/2010 | |

OTHER PUBLICATIONS

Translation of JP2010083251 (Year: 2010).*
Translation of CN 108556924 (Year: 2020).*

* cited by examiner

*Primary Examiner* — Dennis H Pedder
(74) *Attorney, Agent, or Firm* — Amin, Turocy & Watson, LLP

(57) ABSTRACT

A body structure for a vehicle includes an A-pillar and a side sill, wherein the A-pillar includes a vertical front pillar; a front roof pillar extending from an upper end of the vertical front pillar toward an upper rear side thereof; a first reinforcing plate provided in the vertical front pillar and extending in the same direction with the vertical front pillar; and a second reinforcing plate provided in the front roof pillar extending in the same direction with the front roof pillar. The side sill is connected to a lower end of the vertical front pillar and extending along a horizontal direction. The first reinforcing plate is formed to cover a front door hinge mounting portion in the A-pillar and a connection portion of the vertical front pillar and the side sill. An uncoupled portion is formed between the second reinforcing plate and the first reinforcing plate.

6 Claims, 2 Drawing Sheets

BODY STRUCTURE FOR VEHICLE

CROSS-REFERENCE TO RELATED APPLICATION

The priority is claimed based on a Chinese Patent Application No. 202011206083.1, filed on Nov. 2, 2020. The content of the Chinese Patent Application is incorporated herein by reference.

TECHNICAL FIELD

The present disclosure relates to a technical field of a vehicle. More specifically, the present disclosure relates to a body structure for a vehicle.

BACKGROUND ART

Generally, a front portion of a vehicle body includes an A-pillar and a side sill. Basically, the A-pillar of the vehicle extends between a roof rail and a bottom locker of the vehicle in a direction from bottom to top of the vehicle. As an important configuration part of the vehicle body, the A-pillar is configured to secure a survival space for the occupants in the compartment when the collision occurs to the vehicle. Specifically, when the collision occurs from the front of the vehicle, the majority of the energy is absorbed during the procedure in which the front rail of the engine room is crushed; however, a small amount of the energy is transmitted to the A-pillar. In order to secure the survival space for the occupants, it is necessary for the A-pillar to have sufficient strength so as to not to be crushed when receiving the impact due to the collision.

According to the conventional technology, in order to raise the strength of the A-pillar, generally, a reinforcing member is provided in the A-pillar so as to reduce the degree of the A-pillar being crushed and deformed toward the interior space of the vehicle due to the external collision by the reinforcing member.

For example, an A-pillar reinforcing plate mounting structure is disclosed in Patent Document 1. The A-pillar reinforcing plate mounting structure disclosed in Patent Document 1 includes an upper A-pillar reinforcing plate, a roof rail reinforcing plate, and a lower A-pillar reinforcing plate. At least part of the roof rail reinforcing plate is disposed below the upper A-pillar reinforcing plate and welded to the upper A-pillar reinforcing plate. At least part of the lower A-pillar reinforcing plate is disposed below the upper A-pillar reinforcing plate and welded to the upper A-pillar reinforcing plate.

According to Patent Document 1, one end of the upper A-pillar reinforcing plate is welded to the lower A-pillar reinforcing plate and the other end of the upper A-pillar reinforcing plate is welded to the roof rail reinforcing plate such that the overlap amount between the roof rail reinforcing plate and the upper A-pillar reinforcing plate and the overlap amount between the lower A-pillar reinforcing plate and the upper A-pillar reinforcing plate become larger. According to the configuration, the structural strength and the torsional rigidity of the A-pillar reinforcing plate mounting structure are improved; however, the rigidity of the A-pillar becomes excessively large such that the rigidity balance between the front portion of the vehicle body and the rear portion of the vehicle body may collapse.

CITATION LIST

Patent Document

[Patent Document 1] Chinese Utility Model Application Publication No. 208007078U

SUMMARY

The present application is made in consideration of the above circumstances, and an objection of the present disclosure is to provide a body structure of a vehicle including an A-pillaring having a sufficient strength and keeping the rigidity balance between the vehicle head portion and the vehicle tail portion.

In order to solve the above-mentioned technology problem, the present disclosure provides a body structure. The body structure for a vehicle includes an A-pillar and a side sill, wherein the A-pillar includes a vertical front pillar; a front roof pillar extending from an upper end of the vertical front pillar toward an upper rear side thereof; a first reinforcing plate provided in the vertical front pillar, the first reinforcing plate extending in the same direction with the extending direction of the vertical front pillar; and a second reinforcing plate provided in the front roof pillar, the second reinforcing plate extending in the same direction with the extending direction of the front roof pillar, the side sill is connected to a lower end of the vertical front pillar and the side sill extending along a horizontal direction, the first reinforcing plate is formed to cover both of a front door hinge mounting portion in the A-pillar and a connection portion of the vertical front pillar and the side sill, and an uncoupled portion is formed between a lower end of the second reinforcing plate and an upper end of the first reinforcing plate.

According to the body structure for a vehicle having the above-described configuration, firstly, the first reinforcing plate is configured to improve the strength of the front door hinge mounting portion and the connection portion of the vertical front pillar and the side sill to improve the rigidity of the vehicle body by simultaneously covering the front door hinge mounting portion and the connection portion of the vertical front pillar and the side sill such that it is beneficial to improve the driving performance of the vehicle. Furthermore, the first reinforcing plate and the second reinforcing plate are disposed to be apart away from each other rather than being connected to each other by forming the uncoupled portion between the first reinforcing plate and the second reinforcing plate, it is possible to reduce the degree of compensating the rigidity of the A-pillar by the first reinforcing plate and the second reinforcing plate so as to prevent the rigidity of the A-pillar from being excessively large and keep the rigidity balance between the front portion of the vehicle body and the rear portion of the vehicle body.

As an improvement of the body structure for a vehicle according to the present disclosure, the vertical front pillar may include a lower outer plate and a lower inner plate disposed to face each other, the front roof pillar may include an upper outer plate and a lower outer plate disposed to face each other, an upper end of the lower outer plate may be joined with a lower end of the upper outer plate, and a first connection gap is formed in a joined portion of the lower outer plate and the upper outer plate, an upper end of the lower inner plate may be joined with a lower end of the upper inner plate, and a second connection gap may be formed in a joined portion of the lower inner plate and the upper inner plate, and a horizontal height of the uncoupled portion, a horizontal height of the first connection gap, and a horizontal height of the second connection gap may be different from each other. Normally, when the collision occurs in front of the vehicle, the portions where the rigidity is relatively weak such as the uncoupled portion, the first connection gap, and the second connection gap are easy to be fractured. By forming the uncoupled portion, the first connection gap, and the second connection gap at positions having different horizontal heights, it is possible to shift the portions where the rigidity is relatively weak such as the uncoupled portion, the first connection gap, and the second connection gap in the vertical up-down direction so as to improve the rigidity of the A-pillar along the front-rear direction. Accordingly, when the collision occurs in front of the vehicle, the A-pillar is configured to effectively resist the load input from the front side of the vehicle to prevent the A-pillar from being crushed and deformed.

In the body structure for a vehicle as described above, the horizontal height of the uncoupled portion may be higher than the horizontal height of the first connection gap and the horizontal height of the second connection gap. According to the present configuration, the first reinforcing plate is configured to cover and reinforce the first connection gap and the second connection gap such that the connection of the lower outer plate and the upper outer plate and the connection of the lower inner plate and the upper inner plate becomes stronger and the rigidity of the whole A-pillar is improved.

As an improvement of the body structure for a vehicle provided in the present disclosure, the body structure for a vehicle according may further include a front rail extending in a horizontal direction and connected to the A-pillar, and the horizontal height of the uncoupled portion may be different from a horizontal height of the front rail. When the collision occurs in front of the vehicle, the portion having the same horizontal height with the front rail provided in the A-pillar receives the maximum force to be easily fractured. Here, by disposing the uncoupled portion at a position having the horizontal height different from the horizontal height of the front rail, it is possible to make the uncoupled portion be away from the portion receiving the maximum force when the collision occurs in front of the vehicle. As a result, it is possible to improve the rigidity of the A-pillar and reduce the risk of the A-pillar being fractured from the uncoupled portion when the collision occurs in front of the vehicle.

Furthermore, the vertical front pillar may include a lower outer plate and a lower inner plate disposed to face each other, the front roof pillar may include an upper outer plate and a lower outer plate disposed to face each other, an upper end of the lower outer plate may be joined with a lower end of the upper outer plate, and a first connection gap may be formed in a joined portion of the lower outer plate and the upper outer plate, an upper end of the lower inner plate may be joined with a lower end of the upper inner plate, and a second connection gap may be formed in a joined portion of the lower inner plate and the upper inner plate, and a horizontal height of the front rail, a horizontal height of the first connection gap, and a horizontal height of the second connection gap may be different from each other. As described above, when the collision occurs in front of the vehicle, the portion having the same horizontal height with the front rail provided in the A-pillar receives the maximum force to be easily fractured. Here, by disposing the first connection gap and the second connection gap at positions having the horizontal height different from the horizontal height of the front rail, it is possible to make the first connection gap and the second connection gap to be away from the portion receiving the maximum force when the collision occurs in front of the vehicle. As a result, it is possible to improve the rigidity of the A-pillar and reduce the risk of the A-pillar being fractured from the first connection gap and the second connection gap when the collision occurs in front of the vehicle.

As a further improvement of the body structure for a vehicle provided in the present disclosure, the front door hinge mounting portion may include an upper hinge mounting portion and a lower hinge mounting portion, and the first reinforcing plate may be configured to simultaneously cover the upper hinge mounting portion and the lower hinge mounting portion. In other words, the first reinforcing plate is configured to simultaneously cover the upper hinge mounting portion, the lower hinge mounting portion, and the connection portion of the vertical front pillar and the side sill such that it is possible to improve the strength and the rigidity of three portions including the upper hinge mounting portion, the lower hinge mounting portion, and the connection portion of the vertical front pillar and the side sill by a single first reinforcing plate. As a result, it is possible to reduce the cost and simplify the assembly process.

Advantageous Effects of Invention

According to the body structure for a vehicle in the above-described aspects of the present disclosure, at least provides the following advantageous effects can be achieved.

By forming the uncoupled portion between the first reinforcing plate and the second reinforcing plate, in other words, the first reinforcing plate and the second reinforcing plate are disposed to be apart away from each other rather than being connected to each other, it is possible to reduce the degree of compensating the rigidity of the A-pillar by the first reinforcing plate and the second reinforcing plate so as to prevent the rigidity of the A-pillar from being excessively large and keep the rigidity balance between the front portion of the vehicle body and the rear portion of the vehicle body.

The first reinforcing plate is configured to cover the front door hinge mounting portion and the connection portion of the vertical front pillar and the side sill so as to improve the strength at the front door hinge mounting portion and the connection portion of the vertical front pillar and the side sill. As a result, it is beneficial to improve the driving performance.

By forming the uncoupled portion, the first connection gap, and the second connection gap at positions having different horizontal heights, it is possible to shift the portions where the rigidity is relatively weak such as the uncoupled portion, the first connection gap, and the second connection gap in the vertical up-down direction so as to improve the rigidity of the A-pillar along the front-rear direction. Accordingly, when the collision occurs in front of the vehicle, the A-pillar is configured to effectively resist the load input from the front side of the vehicle to prevent the A-pillar from being crushed and deformed.

The first reinforcing plate is configured to cover and reinforce the first connection gap and the second connection gap such that the connection of the lower outer plate and the upper outer plate and the connection of the lower inner plate and the upper inner plate becomes stronger and the rigidity of the whole A-pillar is improved.

By disposing the uncoupled portion at a position having the horizontal height different from the horizontal height of the front rail, it is possible to make the uncoupled portion to be away from the portion receiving the maximum force when the collision occurs in front of the vehicle. As a result, it is possible to improve the rigidity of the A-pillar and reduce the risk of the A-pillar being fractured from the uncoupled portion when the collision occurs in front of the vehicle.

By disposing the first connection gap and the second connection gap at positions having the horizontal height different from the horizontal height of the front rail, it is possible to make the first connection gap and the second connection gap to be away from the portion receiving the maximum force when the collision occurs in front of the vehicle. As a result, it is possible to improve the rigidity of the A-pillar and reduce the risk of the A-pillar being fractured from the first connection gap and the second connection gap when the collision occurs in front of the vehicle.

It is possible to improve the strength and the rigidity of three portions including the upper hinge mounting portion, the lower hinge mounting portion, and the connection portion of the vertical front pillar and the side sill by a single first reinforcing plate. As a result, it is possible to reduce the cost and simplify the assembly process.

DESCRIPTION OF EMBODIMENTS

In order to make the technical problem, the solutions and the effects of the present application more clear, hereinafter, embodiments of the present application will be described with reference to the figures. Hereinafter, the following embodiments are only used to describe the present application and are not used to limit the present application. Also, the configurations shown in figures are only specific examples of the present application and the person with ordinary skill in the art can achieve other figures based on the enclosed figures of the present application.

In the following description, it is noted that the terms "upper", "lower", "front", and "rear" should be understood with reference to the vehicle. For example, the term. "upper" refers to the direction toward the roof portion of the vehicle, the term "lower" refers to the direction toward the bottom portion of the vehicle, the term "front" refers to the direction toward the vehicle head, and the term "rear" refers to the direction toward the vehicle tail. Such terms are only used to easily describe the directions and positional relationships based on the enclosed figures. Such terms are not used to indicate or implicit the apparatus and the element thereof have the particular directions and positions, to be configured and operated in the particular directions and at the specific positions, such that the present disclosure is not limited by these terms. For a person with ordinary skill in the art, the specific meaning of the above-mentioned terms may be suitably understood according to the actual situation. The terms "first", "second", and "third" are only used for making the description easy to understand, and they are not used to indicate or implicit the importance of the configurations or implicit the amount of the technical features. Unless otherwise defined, the term "a plurality of" means that an amount equal to two or more than two.

In the following description, unless otherwise defined, the terms "attach", "communicate", "connect" or the like should be broadly understood. For example, according to such terms, it is possible to perform a fixedly connection, or a detachably connection, or an integrally connection. Also, a mechanical connection may be performed while an electrical connection may be performed. Furthermore, a direct connection, an indirect connection via an intermediate media, or a connection connecting the inside of two elements may be performed. For a person with ordinary skill in the art, the specific meaning of the above-mentioned terms may be suitably understood according to the actual situation.

The present embodiment shows a preferable example of a body structure for a vehicle.

Figure 1:
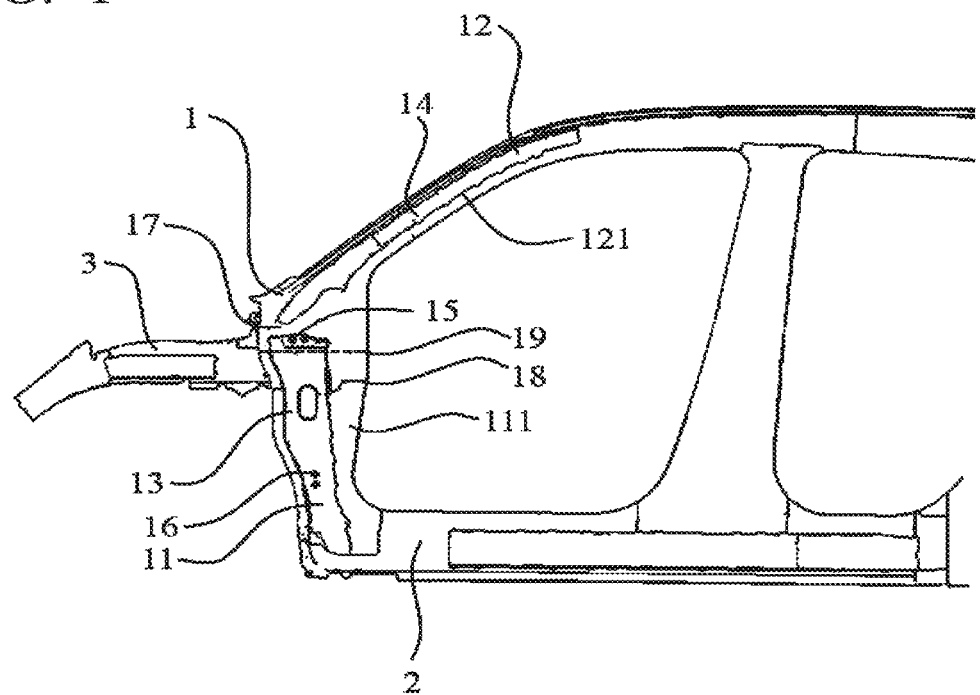
FIG. 1 is a structural schematic view showing a body structure viewed from an internal side toward an external side, and an upper inner plate and a lower inner plate of an A-pillar are omitted for showing a first reinforcing plate and a second reinforcing plate of the A-pillar.
Figure 3:
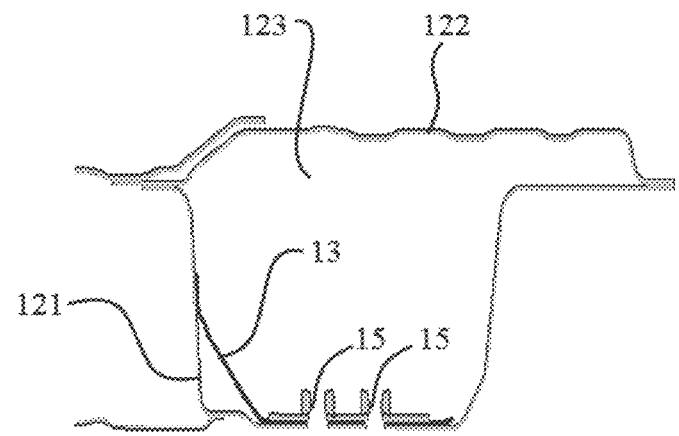
FIG. 3 is a cross-sectional schematic view showing a position where an upper hinge mounting portion is disposed in the A-pillar.
Figure 4:
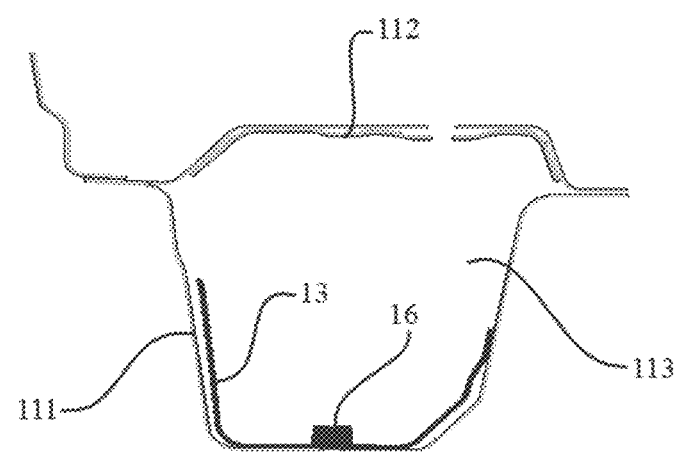
FIG. 4 is a cross-sectional schematic view showing a position where a lower hinge mounting portion is disposed in the A-pillar.
Figure 5:
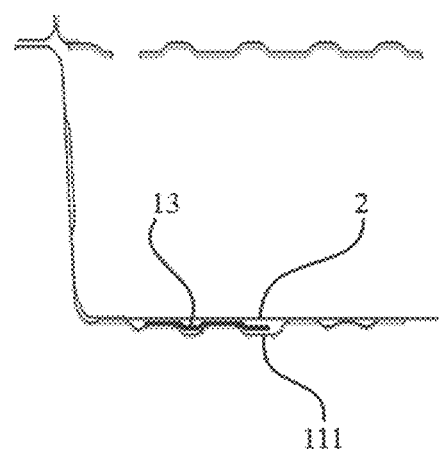
FIG. 5 is a cross-sectional schematic view showing a position of a connection portion between the A-pillar and the side sill.

In the present embodiment, the body structure for a vehicle includes an A-pillar 1 and a side sill 2. The A-pillar 1 includes a vertical front pillar 11, and a front roof pillar 12 extending from an upper end of the vertical front pillar 11 toward an upper rear side thereof. The side sill 2 is connected to a lower end of the vertical front pillar 11, and the side sill extends along the horizontal direction. The A-pillar 1 includes a first reinforcing plate 13 disposed in the vertical front pillar 11 and extending in the same direction with the extending direction of the vertical front pillar 11, and a second reinforcing plate 14 disposed in the front roof pillar 12 and extending in the same direction with the extending direction of the front roof pillar 12. The first reinforcing plate 13 is configured to cover a front door hinge mounting portion in the A-pillar 1 and a connection portion of the vertical front pillar 11 and the side sill 2. Here, the front door hinge mounting portion includes an upper hinge mounting point 15 disposed in the lower portion of the front roof pillar 12 and a lower hinge mounting point 16 disposed in the lower portion of the vertical front pillar 11 for being connected to the front door of the vehicle. In FIG. 4, a cross-sectional view at the position of the lower hinge mounting point 16 in the vertical front pillar 11 is shown. As shown in FIG. 4, the vertical front pillar 11 includes a lower outer plate 111 and a lower inner plate 112 disposed to face each other, wherein a front edge and a rear edge of the lower outer plate 111 are fixed to a front edge and a rear edge of the lower inner plate 112 by welding, respectively. An intermediate portion of the lower outer plate 111 and an intermediate portion of the lower inner plate 112 are apart away from each other to form a first accommodation cavity 113. In FIG. 3, a cross-sectional view at the position of the upper hinge mounting point 15 of the front roof pillar 12 is shown. As shown in FIG. 3, the front roof pillar 12 includes an upper outer plate 121 and an upper inner plate 122 disposed to face each other, wherein a front edge and a rear edge of the upper outer plate 121 are fixed to a front edge and a rear edge of the upper inner plate 122 by welding, respectively. An intermediate portion of the upper outer plate 121 and an intermediate portion of the upper inner plate 122 are apart away from each other to form a second accommodation cavity 123. In FIG. 1, a structural schematic view showing the body structure viewed from an internal side toward an external side is shown. In FIG. 1, the upper inner plate 122 and the lower inner plate 112 of the A-pillar 1 are omitted for showing the first reinforcing plate 13 and the second reinforcing plate 14 of the A-pillar 1. As shown in FIG. 1, the first reinforcing plate 13 is formed in an elongated shape to extend in the same direction with the extending direction of the lower outer plate 111. A lower portion of the first reinforcing plate 13 is accommodated in the first accommodation cavity 113. In FIG. 4, part of the first reinforcing plate 13 accommodated in the first accommodation cavity 13 is connected and fixed to an inner side of the lower outer plate 111. The first reinforcing plate 13 extends upwardly and an upper end of the first reinforcing plate 13 is accommodated in the second accommodation cavity 123. In FIG. 3, the upper portion of the reinforcing plate 13 entering the second accommodation cavity 123 is connected and fixed to the upper outer plate 121. As shown in FIG. 1, the upper end of the reinforcing plate 13 is higher than the position of the upper hinge mounting point 15, and a lower end of the first reinforcing plate 13 extends to the position lower than the position of the lower hinge mounting point 16. Accordingly, the first reinforcing point 13 is configured to simultaneously cover the upper hinge mounting point 15 and the lower hinge mounting point 16. Furthermore, in FIG. 5, a cross-sectional view at the position of the connection portion of the vertical front pillar 11 and the side sill 2 is shown. As shown in FIG. 5, the upper end of the first reinforcing plate 13 extends to be lower than the position of the connection portion of the vertical front pillar 11 and the side sill 2. In other words, the lower end of the reinforcing plate 13 also covers the connection portion of the vertical front pillar 11 and the side sill 2.

As described above, the first reinforcing plate 13 is capable of simultaneously covering the upper hinge mounting point 15, the lower hinge mounting point 16, and the connection portion of the vertical front pillar 11 and the side sill 2. Accordingly, it is possible to improve the strength and the rigidity of three portions including the upper hinge mounting point 15, the lower hinge mounting point 16, and the connection portion of the vertical front pillar 11 and the side sill 2 by the single first reinforcing plate 13. As a result, it is possible to reduce the cost and simplify the assembly process.

According to the present embodiment, an uncoupled portion 17 is formed between the lower end of the second reinforcing plate 14 and the upper end of the first reinforcing plate 13. In FIG. 1, the second reinforcing plate 14 is formed in an elongated shape and extends in the same direction with the extending direction of the upper outer plate 121. The second reinforcing plate 14 is accommodated in the second accommodating cavity 123, and the second reinforcing plate 14 is connected and fixed to the upper outer plate 121. The most important point is that there is a gap between the lower end of the second reinforcing plate 14 and the upper end of the first reinforcing plate 13. This gap is the above-described uncoupled portion 17. In other words, the first reinforcing plate 13 and the second reinforcing plate 14 are not connected to each other. According to the configuration, it is possible to reduce the degree of compensating the rigidity of the A-pillar 1 by the first reinforcing plate 13 and the second reinforcing plate 14 so as to prevent the rigidity of the A-pillar 1 from becoming excessively large to some extent and keep the balance of the rigidity between the front portion and the rear portion of the vehicle body.

Figure 2:
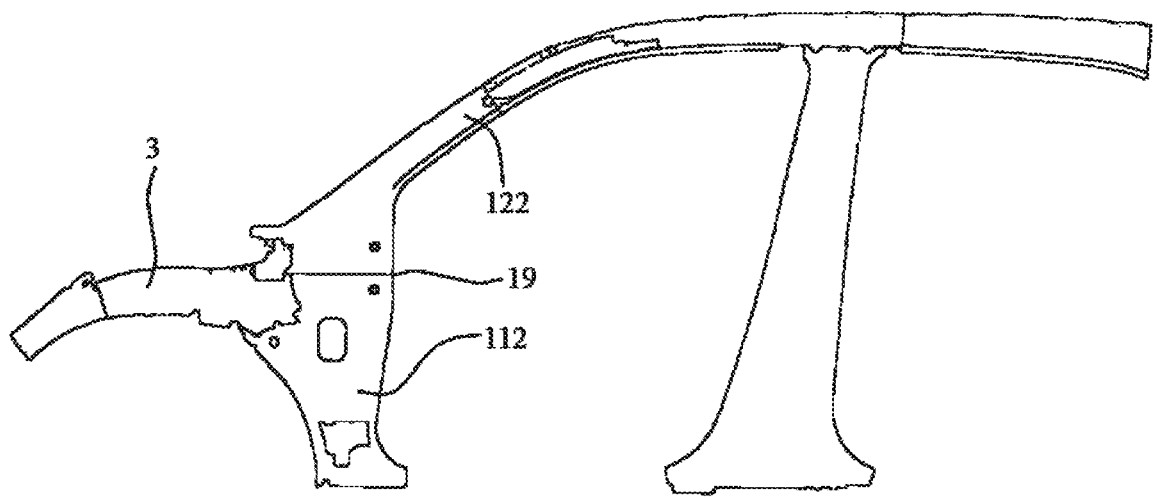
FIG. 2 is a structural schematic view showing a body structure viewed from the external side toward the internal side, and an upper outer plate, a lower outer plate, the first reinforcing plate, and the second reinforcing plate are omitted for showing a second connection gap.

Furthermore, in FIG. 1, the upper end of the lower outer plate 111 and the lower end of the upper outer plate 121 are joined by welding. Naturally, a gap due to the welding process is formed in the connection portion of the lower outer plate 111 and the upper outer plate 121. In order to make the description easy, the welding gap between the lower outer plate 111 and the upper outer plate 121 is referred to as a first connection gap 18. Similarly, in FIG. 2, the structural schematic view of the body structure viewed from the external side toward the internal side is shown. In FIG. 2, in order to show the second connection gap 19, the upper outer plate 121, the lower outer plate 111, the first reinforcing plate 13, and the second reinforcing plate 14 are omitted. The upper end of the lower inner plate 112 and the lower end of the upper inner plate 122 are joined by welding. Naturally, a gap due to the welding process is formed in the connection portion of the lower inner plate 112 and the upper inner plate 122. In order to make the description easy, the welding gap between the lower inner plate 112 and the upper inner plate 122 is referred to as a second connection gap 19. Here, the horizontal height of the uncoupled portion 17, the horizontal height of the first connection gap 18, and the horizontal height of the second connection gap 19 are different from each other. In FIG. 1, in order to show the relative positional relationships of the uncoupled portion 17, the first connection gap 18, and the second connection gap 19 in the single figure, the second connection gap 19 is shown by using a broken line. As shown in FIG. 1, the uncoupled portion 17, the first connection gap 18, and the second connection gap 19 are disposed in this sequence from a higher position to a lower position. Generally, when the collision occurs toward the front side of the vehicle, the uncoupled portion 17, the first connection gap 18, and the second connection gap 19, as the portions where the rigidity is relatively weak, are easy to be fractured. By disposing the uncoupled portion 17, the first connection gap 18, and the second connection gap 19 at different horizontal heights, it is possible to shift the positions of the three portions including the uncoupled portion 17, the first connection gap 18, and the second connection gap 19 where the rigidity is relatively weak in the vertical up-down direction. As a result, it is possible to improve the rigidity of the A-pillar 1 in the front-rear direction such that the load input to the front portion of the vehicle is effectively resisted by the A-pillar 1 when the collision occurs from the front side to the vehicle, and it is possible to prevent the A-pillar 1 from being crushed and deformed when the collision occurs from the front side to the vehicle.

Furthermore, in FIG. 1, the upper end of the first reinforcing plate 13 extends upwardly to a position higher than the second connection gap 19. The horizontal height of the uncoupled portion 17 is higher than the horizontal height of the first connection gap 18 and the horizontal height of the second connection gap 19. According to the configuration, the first reinforcing plate 13 is configured to cover the first connection gap 18 and the second connection gap 19. The first reinforcing plate 13 is configured to reinforce the rigidity of the positions where the first connection gap 18 and the second connection gap 19 are formed so as to make the connection between the lower outer plate 111 and the upper outer plate 121 and the connection between the lower inner plate 112 and the upper inner plate 122 to be stronger and improve rigidity of the whole A-pillar 1.

Furthermore, in FIG. 1, the body structure according to the present embodiment further includes a front rail 3 extending in the horizontal direction and having a rear end connected to the A-pillar 1. The horizontal height of the uncoupled portion 17 is different from the horizontal height of the front rail 3. It is the most preferable that the horizontal height of the uncoupled portion 17 is different from the horizontal height of the horizontal axis of the front rail 3. As shown in FIG. 1, the horizontal height of the front rail 3 is equal to or lower than the horizontal height of the uncoupled portion 17, and the front rail 3 is coincided with the upper portion of the first reinforcing plate 13. When the collision occurs from the front side to the vehicle, the collision force received by the portion at the same horizontal height with the front rail 3 is the largest in the A-pillar 1 such that this portion is the easiest to be fractured. Here, by setting the horizontal height of the uncoupled portion 17 to be different from the horizontal height of the front rail 3, it is possible to make the uncoupled portion 17 to be away from the position that is the easiest to be fractured when the collision occurs from the front side to the vehicle. As a result, it is possible to improve the rigidity of the A-pillar 1 and reduce the risk that the A-pillar 1 is fractured from the position of the uncoupled portion 17 when the collision occurs from the front side to the vehicle.

Furthermore, in FIG. 1, each of the horizontal heights of the first connection gap 18 and the second connection gap 19 is different from the horizontal heights of the front rail 3. As shown in FIG. 1, the horizontal height of the front rail 3 is set between the horizontal height of the first connection gap 18 and the horizontal height of the second connection gap 19. As described above, when the collision occurs from the front side to the vehicle, the collision force received by the portion at the same horizontal height with the front rail 3 is the largest in the A-pillar 1 such that this portion is the easiest to be fractured. Here, by setting the horizontal height of the first connection gap 18 and the horizontal height of the second connection gap 19 to be different from the horizontal height of the front rail 3, it is possible to make the first connection gap 18 and the second connection gap 19 to be away from the position that is the easiest to be fractured when the collision occurs from the front side to the vehicle. As a result, it is possible to improve the rigidity of the A-pillar 1 and reduce the risk that the A-pillar 1 is fractured from the position of the first connection gap 18 or the second connection gap 19 when the collision occurs from the front side to the vehicle.

Although the respective embodiments and modifications of the present disclosure have been described above, the technical scope of the present disclosure is not limited to the above-described embodiments, and configurations in the respective embodiments and modifications within the scope not departing from the spirit of the present disclosure. It is possible to change the combination of elements, make various changes to each configuration element, or delete each configuration element. The present disclosure is not limited by the above description, and is only limited by the appended claims.

REFERENCE SIGNS LIST

1 A-pillar
2 side sill
11 vertical front pillar
12 front roof pillar
13 first reinforcing plate
14 second reinforcing plate
111 lower outer plate
112 lower inner plate
113 first accommodation cavity
121 upper outer plate
122 upper inner plate
123 second accommodation
15 upper hinge mounting portion
16 lower hinge mounting portion
17 uncoupled portion
18 first connection gap
19 second connection gap
3 front rail

What is claimed is:

1. A body structure for a vehicle, comprising:
an A-pillar and a side sill,
wherein the A-pillar includes:
a vertical front pillar;
a front roof pillar extending from an upper end of the vertical front pillar toward an upper rear side thereof;
a first reinforcing plate provided in the vertical front pillar, the first reinforcing plate extending in the same direction with the extending direction of the vertical front pillar; and
a second reinforcing plate provided in the front roof pillar, the second reinforcing plate extending in the same direction with the extending direction of the front roof pillar,
the side sill is connected to a lower end of the vertical front pillar and the side sill extending along a horizontal direction,
the first reinforcing plate is formed to cover both of a front door hinge mounting portion in the A-pillar and a connection portion of the vertical front pillar and the side sill, and
an uncoupled portion is formed between a lower end of the second reinforcing plate and an upper end of the first reinforcing plate.

2. The body structure for a vehicle according to claim 1, wherein the vertical front pillar includes a lower outer plate and a lower inner plate disposed to face each other,
the front roof pillar includes an upper outer plate and a lower outer plate disposed to face each other,
an upper end of the lower outer plate is joined with a lower end of the upper outer plate, and a first connection gap is formed in a joined portion of the lower outer plate and the upper outer plate,
an upper end of the lower inner plate is joined with a lower end of the upper inner plate, and a second connection gap is formed in a joined portion of the lower inner plate and the upper inner plate, and
a horizontal height of the uncoupled portion, a horizontal height of the first connection gap, and a horizontal height of the second connection gap are different from each other.

3. The body structure for a vehicle according to claim 2, wherein the horizontal height of the uncoupled portion is higher than the horizontal height of the first connection gap and the horizontal height of the second connection gap.

4. The body structure for a vehicle according to claim 1, further comprises a front rail extending in a horizontal direction and connected to the A-pillar,
wherein the horizontal height of the uncoupled portion is different from a horizontal height of the front rail.

5. The body structure for a vehicle according to claim 4, wherein the vertical front pillar includes a lower outer plate and a lower inner plate disposed to face each other,
the front roof pillar includes an upper outer plate and a lower outer plate disposed to face each other, an upper end of the lower outer plate is joined with a lower end of the upper outer plate, and a first connection gap is formed in a joined portion of the lower outer plate and the upper outer plate, an upper end of the lower inner plate is joined with a lower end of the upper inner plate, and a second connection gap is formed in a joined portion of the lower inner plate and the upper inner plate, and a horizontal height of the front rail, a horizontal height of the first connection gap, and a horizontal height of the second connection gap are different from each other.

6. The body structure for a vehicle according to claim 1, wherein the front door hinge mounting portion includes an upper hinge mounting portion and a lower hinge mounting portion, and the first reinforcing plate is configured to simultaneously cover the upper hinge mounting portion and the lower hinge mounting portion.

\* \* \* \* \*